(12) United States Patent
Giardini et al.

(10) Patent No.: US 9,566,654 B2
(45) Date of Patent: Feb. 14, 2017

(54) MULTIPURPOSE ELECTRICAL DISCHARGE MACHINING TOOL FOR A RING SECTOR

(71) Applicant: SNECMA, Paris (FR)

(72) Inventors: Bruno Giardini, Morsang sur Orge (FR); Antoine Marty, Nyon (CH); Xi Tian, Suzhou (CN); Julien Arnould, Ris-Orangis (FR); Etienne Canelle, Draveil (FR); Frederic Hascoet, Saint Germain les Corbeil (FR); Matthieu Lebastard, Paris (FR)

(73) Assignee: SNECMA, Paris (FR)

( * ) Notice: Subject to any disclaimer, the term of this patent is extended or adjusted under 35 U.S.C. 154(b) by 106 days.

(21) Appl. No.: 14/566,801

(22) Filed: Dec. 11, 2014

(65) Prior Publication Data

US 2015/0174676 A1    Jun. 25, 2015

(30) Foreign Application Priority Data

Dec. 19, 2013  (FR) ..................................... 13 63068
Apr. 7, 2014   (FR) ..................................... 14 53056

(51) Int. Cl.
*B23H 11/00*    (2006.01)
*B23H 9/10*     (2006.01)
(Continued)

(52) U.S. Cl.
CPC ............ *B23H 11/003* (2013.01); *B23H 9/00* (2013.01); *F01D 9/04* (2013.01); *F01D 11/122* (2013.01);
(Continued)

(58) Field of Classification Search
CPC .. F01D 11/122; F01D 11/127; F05D 2230/10; F05D 2230/11; F05D 2230/12; F05D 2230/13; F05D 2230/14; F05D 2230/18; B23H 9/00; B23H 9/04; B23H 9/10; B23H 9/14; B23H 9/006; B23H 11/003

See application file for complete search history.

(56) References Cited

U.S. PATENT DOCUMENTS 5,188,507 A *  2/1993  Sweeney .................. B23H 9/10
                                                415/170.1
6,844,515 B2 * 1/2005  Byrnes ..................... B23H 9/10
                                                 219/69.11
(Continued)

FOREIGN PATENT DOCUMENTS

EP    1 455 055 A1    9/2004
EP    1 471 212 A1   10/2004
(Continued)

OTHER PUBLICATIONS

French Preliminary Search Report issued Sep. 3, 2014 in French Application 13 63068, filed on Dec. 19, 2013 ( with English Translation of Categories of Cited Documents).

(Continued)

*Primary Examiner* — Geoffrey S Evans
(74) *Attorney, Agent, or Firm* — Oblon, McClelland, Maier & Neustadt, L.L.P.

(57) ABSTRACT

An electrical discharge machining tool of a ring sector for an aircraft turbomachine is provided. The ring sector includes an abradable member and a support element to which the abradable member is fixed; and one or more gripping holes opening on a radially outer surface of a central body of the support element. The machining tool includes at least two machining sets chosen from groove, notch, opening, length-cutting, or abradable element electro-machining sets. The machining tool also has a gripping device for the ring sector by the gripping holes. The gripping device is configured to (Continued)

move the ring sector from one of the electro-machining sets to another of the electro-machining sets.

7 Claims, 6 Drawing Sheets

(51) Int. Cl.
  *B23H 9/00* (2006.01)
  *F01D 9/04* (2006.01)
  *F01D 11/12* (2006.01)
(52) U.S. Cl.
  CPC ....... *F05D 2230/10* (2013.01); *F05D 2240/11* (2013.01)

(56) References Cited

U.S. PATENT DOCUMENTS

| | | | |
|---|---|---|---|
| 7,565,223 B2* | 7/2009 | Moldenhauer | B23H 11/00 219/69.12 |
| 2004/0219009 A1 | 11/2004 | Marchi et al. | |
| 2004/0231155 A1 | 11/2004 | Le Saint et al. | |
| 2005/0249584 A1 | 11/2005 | Amio et al. | |
| 2005/0262683 A1* | 12/2005 | Ahti | B23Q 3/103 29/563 |
| 2008/0041826 A1* | 2/2008 | Vau | B23H 7/28 219/69.2 |

FOREIGN PATENT DOCUMENTS

| | | |
|---|---|---|
| EP | 1 593 813 A1 | 11/2005 |
| GB | 2 388 161 | 11/2003 |
| GB | 2 484 188 | 4/2012 |

OTHER PUBLICATIONS

French Preliminary Search Report issued Sep. 3, 2014 in French Application 1363068, ( with English Translation of Categories of Cited Documents).

* cited by examiner

MULTIPURPOSE ELECTRICAL DISCHARGE MACHINING TOOL FOR A RING SECTOR

TECHNICAL FIELD

The invention relates to the field of ring sectors of a turbine for an aircraft turbomachine, and to the field of electrical discharge machining tools for these ring sectors. More precisely, it relates to the gripping holes provided on these ring sectors, dedicated to holding the sectors during machining operations on an electrical discharge machining tool. It further relates to multipurpose electrical discharge machining tools, particularly intended to machine such ring sectors.

The ring sector according to the invention is applicable to any type of turbomachine, in particular to turbojet engines and turboprop engines.

STATE OF PRIOR ART

On the existing turbomachines, the turbine rings comprise a series of sectors arranged end to end, each having an abradable member as well as a support element for the abradable element. Once these two parts are assembled, the ring sector generally undergoes several electrical discharge machining operations. To do so, the sector is held in position in a dielectric bath.

The quality of the machining operations performed depends in particular on the proper hold of the sector during these operations. Conventionally, in order to perform this hold, gripping holes are provided on the abradable element. However, to ensure a correct hold guarantying good quality machining, these holes must be large, which can subsequently be detrimental to the sealing performances of the abradable element.

Therefore, in order not to deteriorate the sealing capacity of the abradable element, small size gripping holes are frequently made in a limited number. However, this can result in hold problems during machining operations, which can lead to reworks and/or waste, penalizing the productivity.

The electrical discharge machining operations are necessarily carried out one after the other, because no grip on the abradable element with this type of gripping holes, enables all these operations to be performed at one time. They require successive assembly and disassembly steps of the ring sectors on highly specialized machining tools. These assembly/disassembly steps penalize the productivity and multiply the risks of ill-positioning the ring sector.

Since they are highly specialized, the electrical discharge machining tools with a known structure, in particular those intended to hold a ring sector through such holes, are often bulky and heavy. Moreover, manufacturing ring sectors is generally only done in batch mode on these tools, to the detriment of the production flexibility of the ring sectors.

There is therefore a need for optimizing the design of the turbine ring sectors, aiming in particular at offering a solution to this antagonism between the proper hold of a ring sector during the electrical discharge machining operations, and its sealing performances in operation. There is a further need for electrical discharge machining tools, if possible with a limited global size, enabling a greater production flexibility.

DISCLOSURE OF THE INVENTION

The aim of the invention is to solve at least partially the problems experienced in the above described prior art solutions.

To do so, the object of the invention is an electrical discharge machining tool for a ring sector of a turbine for an aircraft turbomachine, configured to manufacture a ring sector such as described hereinafter, the machining tool comprising:
- a frame intended to be immerged into a dielectric bath, and
- a gripping device configured to grip the ring sector to be machined.

According to the invention, the gripping device is configured to grip the ring sector to be machined via gripping holes of the ring sector to be machined.

The frame further comprises at least two of the electro-machining sets for a ring sector to be machined, from the following sets:
- a length-cutting electro-machine set, configured to correct the circumferential length of the ring sector,
- an abradable element electro-machining set, in particular of the honeycomb type,
- a groove electro-machining set, configured to accommodate at least one inter-sector sealing tab, arranged on a circumferential edge of the ring sector,
- a notch electro-machining set located on a downstream rim of a downstream end of a ring sector, the downstream end having the shape of a U opened radially outwards, and
- an electro-machining set for an opening, provided in an upstream end of the ring sector, the upstream end having a C shaped cross-section the opening of which opens on the upstream part of the ring sector. Furthermore, the gripping device is movable in relation to the frame in order to move the ring sector to be machined from an electro-machining set to the other.

The electrical discharge machining tools according to the invention require fewer assembly/disassembly steps for a ring sector, upon manufacturing the ring sector. Given their multipurpose character, they offer more production flexibility, by being less specialized and by offering the possibility of machining more quickly a small number of ring sectors.

Advantageously, the frame comprises a length-cutting electro-machining set having two length-cutting electro-machining stations configured to correct the circumferential length of the ring sector to be machined, both length-cutting electro-machining stations being intended to be facing each other.

According to an embodiment feature, the frame comprises a groove electro-machining set comprising two groove electro-machining stations configured to electro-machine one or more grooves on a circumferential edge of the ring sector to be machined, both groove electro-machining stations being intended to be facing each other.

According to an advantageous embodiment, the frame comprises an opening electro-machining set, the opening electro-machining set being intended to be arranged in a direction substantially perpendicular to the groove electro-machining set and/or the length-cutting machining set.

According to another embodiment feature, the frame comprises an abradable element electro-machining set and an opening electro-machining set, the abradable element electro-machining set being intended to be facing the opening electro-machining set.

According to another advantageous embodiment, the frame comprises an abradable element electro-machining set and a length-cutting electro-machining set intended to be arranged in a direction substantially perpendicular to the abradable element electro-machining set.

According to an embodiment feature, both groove electro-machining stations comprise a single electrode. In this case, at least one of both groove electro-machining stations is preferably more specifically dedicated to holding the ring sector, whereas the station comprising the electrode shapes the ring sector to be machined.

Advantageously, the frame comprises:
- a first tooling plate on which at least one electro-machining set is arranged, and
- a second tooling plate on which at least one electro-machining set is arranged, the second tooling plate being raised with respect to the first tooling plate. Such an arrangement particularly favors a small global size of the machining tool.

The electro-machining sets are particularly configured to perform a hobbing electro-machining.

According to another advantageous embodiment, the gripping device and/or the frame are movable on at least a rail.

The frame is preferably stationary during an electro-machining operation by one of the electro-machining sets for a ring sector to be machined.

Another object of the invention is a ring sector of a turbine for an aircraft turbomachine, comprising an abradable member as well as a support member for the abradable element, said support element having a central body as well as two axial end parts arranged on either side of the central body, both axial end parts each forming means for retaining the ring sector to a turbine casing, said ring sector comprising gripping means for performing electrical discharge machining.

According to the invention, said gripping means comprise one or more gripping holes opening into a radially outer surface of the central body of the support element.

The invention thus breaks with the existing technology according to which the gripping holes were provided on the abradable element. By placing them now in the above presented manner, these holes can have all the required characteristics, especially in terms of numbers and dimensions, to enable a proper hold of the ring sector during its machining operations, without altering its functionalities. In particular, the abradable element not being concerned by these gripping holes, the sealing performances are not reduced.

The invention furthermore provides implementation of one or more of the following optional characteristics.

Each gripping hole opens into a recess defined by said radially outer surface of the central body of the support element.

The radially outer surface bounds at least one boss within the recess, and at least one of the gripping holes opens at the boss.

The gripping holes are slot-shaped.

There are three gripping holes, preferably aligned along a circumferential direction of the ring sector. However, the number of holes can be different from three, without departing from the scope of invention.

Each gripping hole has a length between 8 and 11 mm.

The support element of the abradable element has, at its ends along a circumferential direction of the ring sector, grooved edges to accommodate sealing tabs.

The invention also relates to a turbine ring for an aircraft turbomachine, comprising several ring sectors as the one above described, arranged end to end.

The invention also relates to an aircraft turbomachine comprising a turbine fitted with at least one such ring.

Finally, the invention relates to a method for manufacturing such a ring sector such as above described, by an electrical discharge machining tool such as described above, comprising the following steps:
- assembling the abradable element on its support element, in order to form the ring sector ready to be machined,
- gripping the ring sector, via the gripping hole(s) provided on the support element, using the gripping device of the electrical discharge machining tool, and
- performing a plurality of electrical discharge machining operations, by means of an electrical discharge machining tool, during which machining operations the ring sector is held on the gripping device.

The manufacturing method preferably comprises the following steps:
- correcting the circumferential length of the ring sector, using a length-cutting electro-machining set of the machining tool, then
- electrical discharge machining, by means of a groove electro-machining set of the machining tool, one or more grooves on at least two opposite circumferential edges of the ring sector,
- during which one or more grooves are made on one of the circumferential edges, then the ring sector is turned over on the groove electro-machining set, before making one or more grooves on the opposite circumferential edge.

Other advantages and characteristics of the invention will appear upon reading the non-limiting detailed description hereinafter.

BRIEF DESCRIPTION OF THE DRAWINGS

This description will be made in connection to the accompanied drawings among which.

DETAILED DISCLOSURE OF PARTICULAR EMBODIMENTS

Figure 1:
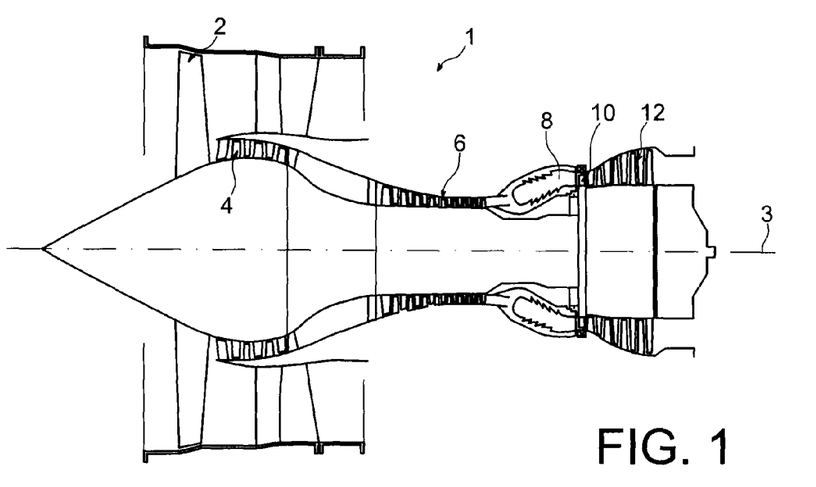
FIG. 1 shows a longitudinal cross-section schematic view of a turbomachine, according to a preferred embodiment of the invention.

Firstly referring to FIG. 1, an aircraft turbomachine 1 is shown, according to a preferred embodiment of the invention. It is here a twin spool turbofan engine. However, it could be a turbomachine of another type, for example a turboprop engine, without departing from the scope of the invention.

Generally speaking, the turbomachine 1 has a longitudinal axis 3 around which its various components extend. It comprises, from upstream to downstream according to a main gas flow direction across this turbomachine, a fan 2, a low pressure compressor 4, a high pressure compressor 6, a combustion chamber 8, a high pressure turbine 10 and a low pressure turbine 12.

Figure 2:
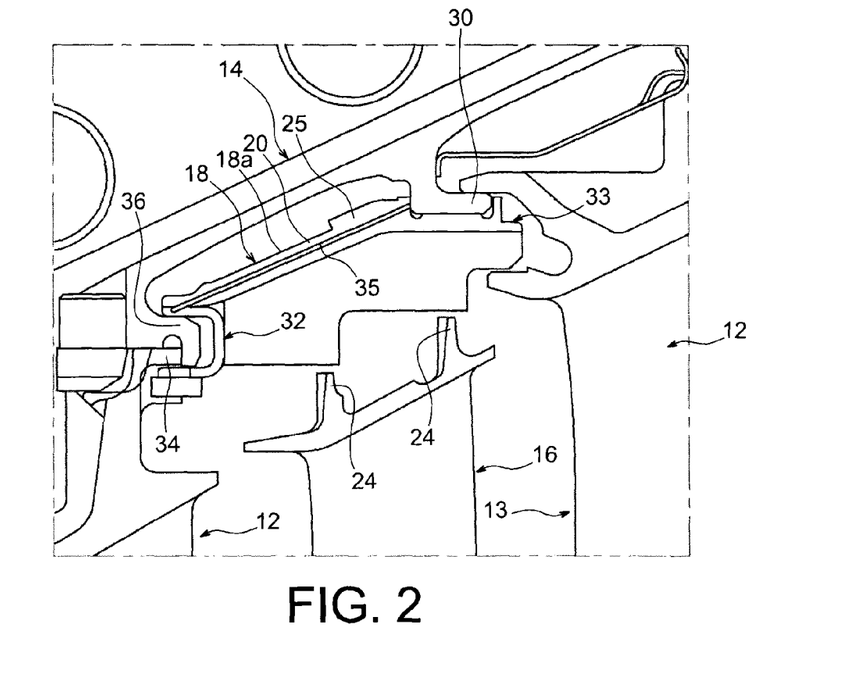
FIG. 2 shows a longitudinal cross-section view of part of the low pressure turbine of the turbomachine shown in the preceding figure.
Figure 3:
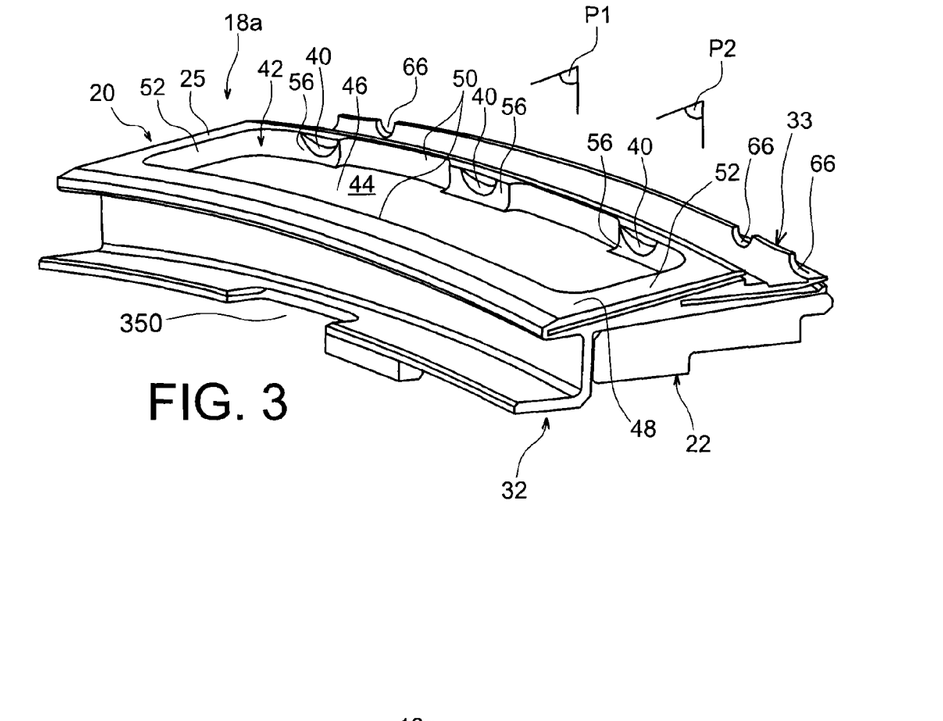
FIG. 3 shows a perspective view of one of the ring sectors of the low pressure turbine shown in the preceding figure.

Part of the low pressure turbine 12 is more detailed in FIG. 2. However, the invention can also apply to the high pressure turbine 10, without departing from the scope of the invention.

The turbine 12 has several stages each comprising a distributor 12, 13 formed by an annular row of stationary vanes carried by a casing 14 of the turbine, and an impeller 16 fitted upstream of the distributor 13 and rotating in a ring 18 hooked to the casing 14. The ring 18 is divided into sectors and formed by several sectors 18a which are circumferentially arranged end to end, each fitted on the casing 14 of the turbine.

Each ring sector 18a comprises a support element 20 and a block-shaped abradable element 22 preferably fixed through brazing and/or welding on the radially inner surface of the element 20.

The support element 20 is preferably of metal, whereas the abradable element 22 is of the honeycomb type. The latter is intended to be worn out by friction on outer annular lips 24 of the vanes of the impeller 16, in order to minimize the radial clearances between the impeller and the ring sectors 18a.

The support element 20 comprises a central body 25 on either side of which lie an upstream axial end part 32, and a downstream axial end part 33. These elements 25, 32, 33 are each annular. They are fixed end to end, for example through brazing/welding, or are alternatively made in one piece. The end parts 32, 33 each form means for retaining the sector 18a to the casing 14.

Still referring to FIG. 2, the upstream end part 32 has an open C-shaped cross-section so as to open towards the upstream part. The C-shaped cross-section has a central opening 350 provided in one of its rims. The upstream end part 32 is axially engaged from the downstream part on the one hand on a cylindrical rim 34 directed towards the downstream part of the distributor 12, and on the other hand on a cylindrical rail 36 of the casing 14 on which this distributor is hooked.

Also, the downstream end part 33 has a generally U-shaped cross-section opened radially outwards, in which a holding hook 30 is engaged, this hook being an integral part of the casing 14.

Conventionally, the sealing between the ring sectors 18a is provided by tabs 35 inserted at theirs circumferential ends in appropriate grooves provided on the circumferential edges 60 of the sectors 18a, one of which will now be detailed referring to FIGS. 3 to 7.

One of the features of the invention lies in the presence of gripping holes 40 opening on a radially outer surface 42 of the main body 25 of the support element. More precisely, this body 25 has a recess of material 44 in its radially outer part, this recess 44 being actually defined by the surface 42. By way of indication, the recess 44 extends on a very large portion of the radially outer part of the body 25, only a substantially rectangular rim 48 being kept at the periphery of the recess 44. The latter allows a weight gain and facilitates the cooperation of the gripping holes with the tooling for performing electrical discharge machining operations.

The recess 44 is thus bounded by the bottom 46, as well as by two walls 50 axially offset from one another, and two walls 52 circumferentially offset from one another. The walls 50, 52 extend substantially along the radially outward direction, from the bottom 46.

On the downstream wall 50 being an integral part of the surface 42, three bosses 56 protruding within the recess 44 are provided. These bosses 56 are prominences which axially extend towards the upstream part from the downstream wall 50.

In each of these bosses 56, one of the gripping holes 40 is made, which then opens into the recess 40. More precisely, each hole 40 has an opening directed towards the upstream part, having the general shape of a slot extending along the circumferential direction, direction along which the three slots 40 are substantially aligned.

Figure 7:
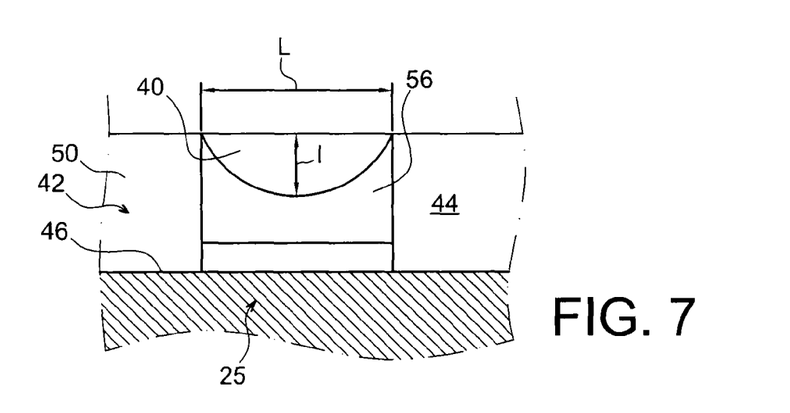
FIG. 7 is a cross-section view of a part of the ring sector, taken along the line VII-VII of FIG. 6.

By way of indicating example, each slot 40 has a length "L" of about 9 mm. This is the maximum length of the slot, which is here directed along the circumferential direction. Besides, each slot 40 has a maximum width "I" of about 2.5 mm, this width being progressive due to its rounded shape, as can be seen in FIG. 7. The width direction of the slots is the radial direction. Finally, as schematized in FIG. 6, the maximum depth "p" of each slot 40 is such as it does not exceed 2 mm, such as the hole 40 remains restricted in the body 25. Here, the depth direction corresponds to the axial direction.

Figure 4:
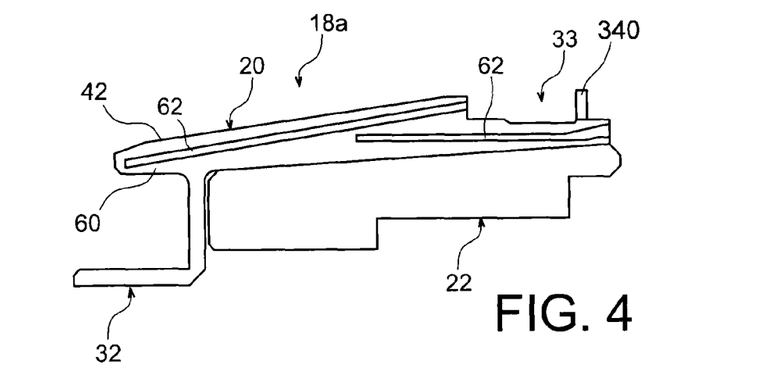
FIG. 4 is a side view of the ring sector shown in the preceding figure.
Figure 5:
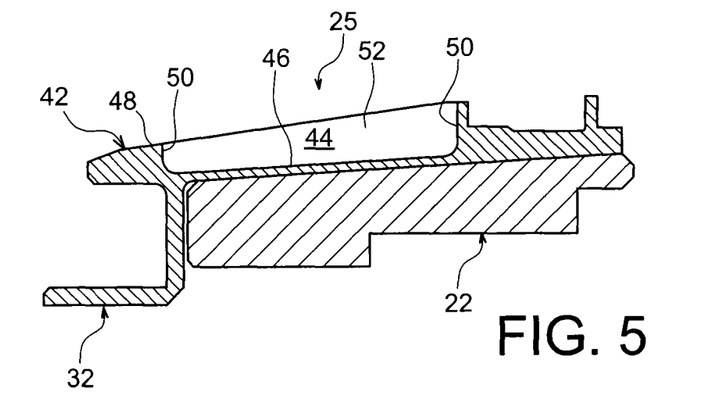
FIGS. 5 and 6 are cross-section views of the ring sector taken along the radial planes P1 and P2 of FIG. 3, respectively.
Figure 6:
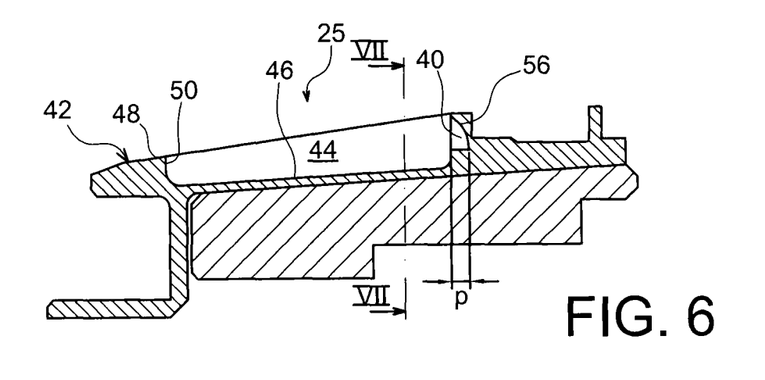

FIG. 4 represents one of both circumferential edges 60 of the ring sector 18a, on which one or more grooves 62 are made for introducing the inter-sector sealing tabs 35.

These grooves 62 are made by electrical discharge machining, this technique being also known as EDM machining (Electrical Discharge Machining). In this regard, upon manufacturing a sector 18a, it is noted that the assembly of the abradable element 22 on its support element 20 is first carried out, preferably through brazing and/or welding, in order to obtain a ring sector ready to be machined. It is therefore on this obtained set that the grooves 62 are made, as well as other EDM machining operations such as the rework of the surface conditions of the abradable element 22, the correction of the circumferential length of the sector, or the creation of notches 66 on a downstream rim 340 of the end part 33, these notches can be seen in FIG. 3. These machining operations are preferably performed by a plurality of electro-machining sets 110, 120, 130, 140, 150 located on a frame 100 of an electrical discharge machining tool 80, such as the one which is represented with reference to FIGS. 8 to 10.

Figure 8:
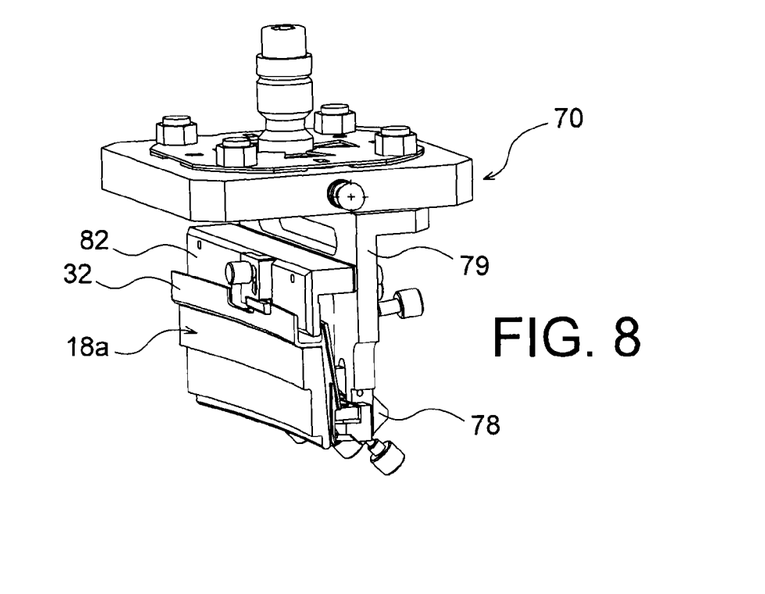
FIG. 8 shows a perspective view of the ring sector shown in the preceding figures, carried by a gripping device.
Figure 9:
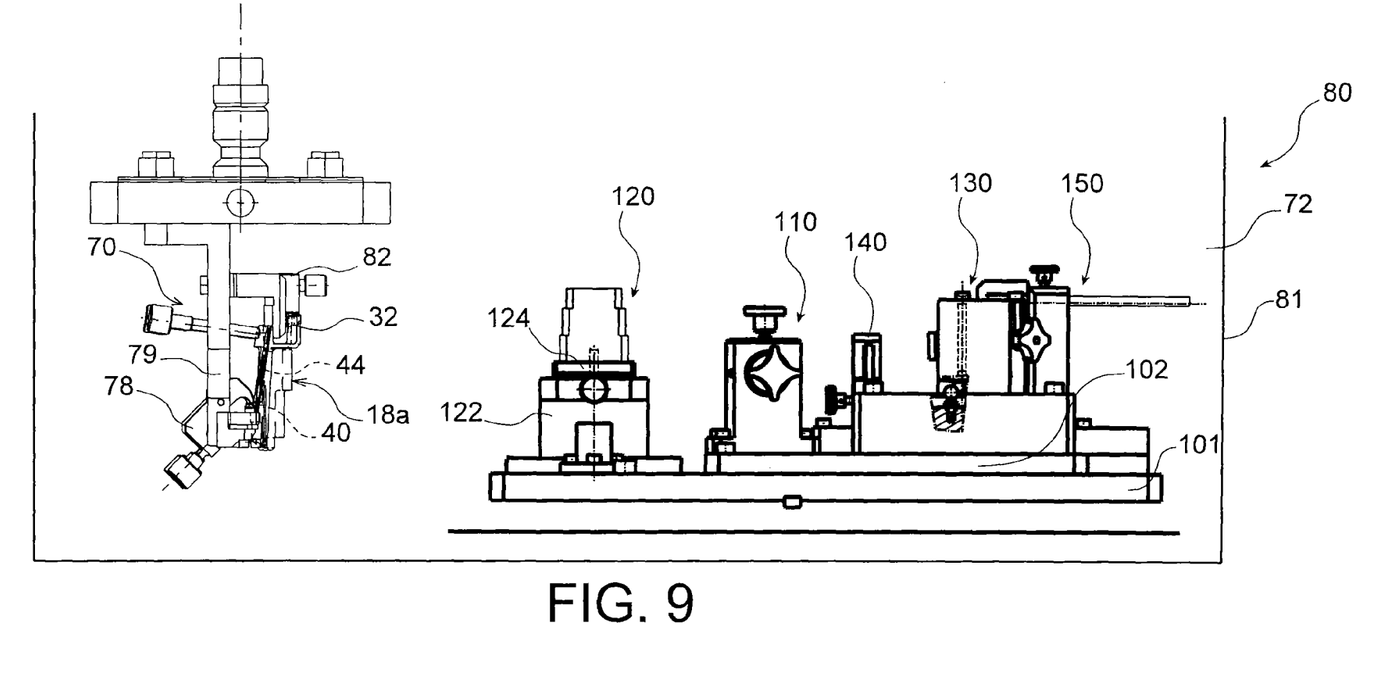
FIG. 9 shows a schematic view of the tool for performing electrical discharge machinings, on the ring sector shown in the preceding figures.

The electrical discharge machining tool 80 has a gripping device 70, represented in greater details with reference to FIGS. 8 and 9, configured to grip the ring sector 18a to be machined. The gripping device 70 is movable in relation to the frame 100 of the tool 80, so as to move the ring sector 18a to be machined from one electro-machining set 110, 120, 130, 140, 150 to the other. More specifically, the frame 100 is stationary during an electro-machining operation by one of the electro-machining sets 110, 120, 130, 140, 150, whereas the gripping device moves with respect to a tank 81 intended to contain dielectric. The gripping device 70 and the frame 100 are movably fitted on rails 103.

More precisely, the gripping device 70 has hooks 78 screwed on the tooling body 79, each hook 78 entering the recess 44 and having an end inserted in a corresponding gripping hole 40. The hooks 78 thus enable the sector 18a to be pressed against the tooling body 79. It is noted that other elements of the gripping device 70 contribute to ensuring this pressing, such as a hook 82 screwed on the tooling body 79 and cooperating with the upstream axial end part 32 of the sector 18a. The specific design of the ring sector 18a of the preferred embodiment and that of the associated gripping device both enable the ring sector 18a to be better held, throughout the desired machining operations.

Figure 10:
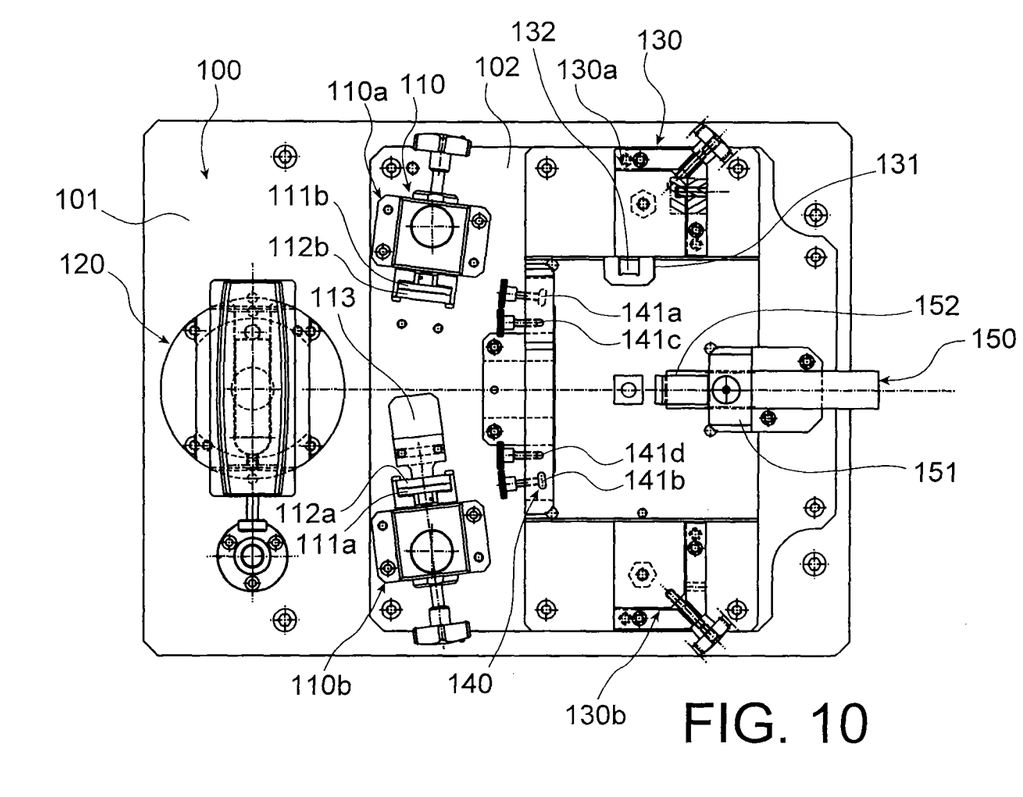
FIG. 10 is a schematic top view of the electrical discharge machining tool of FIG. 9.

The frame 100 of the electrical discharge machining tool 80 comprises a length-cutting electro-machining set 110, an abradable element electro-machining set 120, a groove electro-machining set 130 configured to accommodate at least one sealing tab 35, a notch electro-machining set 140 located on the downstream rim 340 of the downstream end 33, and an opening electro-machining set 150 provided in the upstream end 32. The electro-machining sets 110, 120, 130, 140, 150 are configured to perform a hobbing electro-machining. The position of each of these sets 110, 120, 130, 140, 150 is adjustable on the frame 100, in particular through screwing. Furthermore, it is possible to individually disassemble each of the sets 110, 120, 130, 140, 150 from the frame 100, for example to replace it or when the associated machining operation has already occurred on the ring sector 18a.

The length-cutting electro-machining set 110 is configured to correct the circumferential length of the ring sector 18a. This set comprises two length-cutting electro-machining stations 110a, 110b, intended to be facing each other. The pair of length-cutting electro-machining stations 110a, 110b is movably adjustable, in order to obtain a gap and a suitable alignment between the stations 110a, 110b. The length-cutting set 110 comprises two electrodes 112a, 112b located facing each other on electrode supports 111a, 111b. The position of the length-cutting electrodes 112a, 112b with respect to the length-cutting set 110 is adjustable, particularly through a position pre-adjusting device 113.

Similarly, the groove electro-machining set 130 is configured to electro-machine the grooves 62. This set 130 comprises two groove electro-machining stations 130a, 130b, intended to be facing each other. Analogously, the groove electro-machining stations 130a, 130b are movably adjustable, in order to obtain a gap and a suitable alignment between the stations 130a, 130b. The pair of length-cutting electro-machining stations 110a, 110b and that of groove electro-machining stations 130a, 130b are provided in parallel on the frame 100. The groove electro-machining set 130 comprises one or more electrodes 132, located inside an electrode support 131 having a horse-shoe shape and in which the position of the grooving electrodes 132 is adjustable with respect to the groove electro-machining set 130.

The opening electro-machining set 150 is designed to make the central opening 350 carried out in the C-shaped cross-section rim 32 opened towards the upstream part, thanks to an electrode 152 the position of which is adjustable with respect to the opening electro-machining set 150. The opening electro-machining set 150 is intended to be arranged in a direction substantially perpendicular to the groove electro-machining set 130 and to the length-cutting machining set 110, so as to make the electro-machining tool 80 more compact. The arrangement of the electrical discharge machining tool 80 above all prevents the ring sector 18a to be moved between the groove machining operations 62 and the opening machining operation 350. Both these machining operations can therefore possibly occur substantially simultaneously.

Between the length-cutting machining 110 and groove electro-machining 130 sets, the frame 100 comprises a notch electro-machining set 140 configured to make the notches 66 of the downstream rim 340 of the downstream end 33. The notches 66 having distinct configurations, the notch electro-machining set has several electrode supports 141a, 141c, 141b, 141d. The opening electro-machining set 150 is designed to be facing the abradable element electro-machining set 120, intended to grind the surface condition of the abradable element 22. This set 120 comprises a fixing collar 122 on which is arranged a bulging fixing plate 124 fitting the shape of the abradable element 22.

The opening electro-machining set 150 and the abradable element electro-machining set 120 are provided on two tooling plates 101, 102 spaced apart in the height direction of the frame. The abradable element electro-machining set 120 is the only set which is directly fixed on the first tooling plate 101, whereas the other sets 120, 130, 140, 150 are located on the second tooling plate 102, raised with respect to the first tooling plate 101. The presence of both tooling plates 101, 102 is a good compromise between a great compactness of the electrical discharge machining tool 80 on the one hand and an optimization of the movement of the ring sector 18a from one set to the other on the other hand.

Referring more specifically to FIGS. 9 and 10, the sector 18a, in which the abradable element 22 is already assembled on its support element 20, is gripped by the gripping device 70 via the gripping holes 40. The gripping device 70 then immerses the ring sector 18a in the dielectric bath 72 of the electrical discharge machining tool 80. At the bottom of the bath 72, electrodes are provided in the electrode supports 111a, 111b, 131, 141a, 141c, 141b, 141d and 151, to perform all the electro-machining operations of the ring sector 18a.

The operation of correcting the circumferential length of the ring sector 18a is carried out in a single step, without moving the ring sector 18a during this operation. The ring sector 18a always remains directed in the same direction, by being blocked between the length-cutting electro-machining stations 110a, 110b.

The operation of electro-machining grooves 62 is carried out after the operation of correcting the length of the ring sector 18a. One or more grooves 62 are first made on one of the circumferential edges 60, then the ring sector 18a is turned over on the groove electro-machining set 130, before making one or more grooves 62 on the opposite circumferential edge 60.

The order of the operations of reworking the surface condition of the abradable element 22, of creating notches 66 and of making the opening 350 can be chosen quite freely.

Generally speaking, all the electro-machining operations of the ring sector 18a take place at one time in the dielectric bath 72, that is by keeping the ring sector 18a gripped to the gripping device 70. In other words, the sector 18a is neither taken out of the dielectric bath 72, nor disassembled from the gripping device 70 between the various EDM machining steps. This results in a productivity gain, further improved by the possibility of assembling the ring sectors 18a as a background task on their associated gripping devices 70, before the immersion in the dielectric bath 72 of the tool 80.

Various modifications of the invention which has just been described can of course be carried out by those skilled in the art without departing from the scope of the disclosure of the invention.

The invention claimed is:

1. An electrical discharge machining tool configured to manufacture a ring sector of a turbine for an aircraft turbomachine, the machining tool comprising:
   a frame intended to be immersed into a dielectric bath, and
   a gripping device configured to grip the ring sector to be machined, wherein the gripping device is configured to grip the ring sector to be machined via gripping holes of the ring sector to be machined, wherein the frame comprises at least two of the electro-machining sets of the ring sector to be machined, from the following sets:

a length-cutting electro-machine set, configured to correct the circumferential length of the ring sector, an abradable element electro-machining set, configured to machine an abradable element of the ring sector, a groove electro-machining set, configured to machine a groove arranged on a circumferential edge of the ring sector, the groove being configured to accommodate at least one inter-sector sealing tab, a notch electro-machining set, configured to machine a notch located on a downstream rim of a downstream end of a ring sector, the downstream end having the shape of a U opened radially outwards, and an opening electro-machining set, configured to machine an opening provided in an upstream end of the ring sector, the upstream end having a C-shaped cross-section the opening of which opens into the upstream part of the ring sector, and wherein the gripping device is movable in relation to the frame in order to move the ring sector to be machined from one of the electro-machining sets to another of the electro-machining sets.

2. The electrical discharge machining tool according to claim 1, wherein the frame comprises a length-cutting electro-machining set having two length-cutting electro-machining stations configured to correct the circumferential length of the ring sector to be machined, both length-cutting electro-machining stations being intended to be facing each other.

3. The electrical discharge machining tool according to claim 1, wherein the frame comprises a groove electro-machining set having two groove electro-machining stations configured to electro-machine one or more grooves on a circumferential edge of the ring sector to be machined, both groove electro-machining stations being intended to be facing each other.

4. The electrical discharge machining tool according to claim 2, wherein the frame comprises an opening electro-machining set, the opening electro-machining set being intended to be arranged in a direction substantially perpendicular to the length-cutting machining set.

5. The electrical discharge machining tool according to claim 3, wherein the frame comprises an opening electro-machining set, the opening electro-machining set being intended to be arranged in a direction substantially perpendicular to the groove electro-machining set.

6. A method for manufacturing a ring sector for a turbomachine, by an electrical discharge machining tool according to claim 1, comprising the following steps:

assembling an abradable element on a support element, in order to form the ring sector ready to be machined, gripping the ring sector, via at least one gripping hole provided on the support element, by the gripping device of the electrical discharge machining tool, and performing a plurality of electrical discharge machining operations, by means of the electrical discharge machining tool, during which machining operations the ring sector is held on the gripping device.

7. The manufacturing method according to claim 6, further comprising the following steps:

correcting the circumferential length of the ring sector, using a length-cutting electro-machining set of the machining tool, and then electrical discharge machining, by a groove electro-machining set of the machining tool, one or more grooves on at least two opposite circumferential edges of the ring sector, during which one or more grooves are made on one of the circumferential edges, then the ring sector is turned over on the groove electro-machining set, before making one or more grooves on the opposite circumferential edge.

\* \* \* \* \*